United States Patent
Trainer et al.

(10) Patent No.: US 7,521,901 B2
(45) Date of Patent: Apr. 21, 2009

(54) ELECTRICAL POWER STABILISATION

(75) Inventors: David R Trainer, Derby (GB); John J A Cullen, Derby (GB)

(73) Assignee: Rolls-Royce plc, London (GB)

( * ) Notice: Subject to any disclaimer, the term of this patent is extended or adjusted under 35 U.S.C. 154(b) by 6 days.

(21) Appl. No.: 11/514,949

(22) Filed: Sep. 5, 2006

(65) Prior Publication Data

US 2007/0064458 A1    Mar. 22, 2007

(30) Foreign Application Priority Data

Sep. 17, 2005    (GB) ................ 0519019.4

(51) Int. Cl.
 *H02P 3/00* (2006.01)
 *H02P 9/06* (2006.01)
 *H02P 15/00* (2006.01)
 *H02P 9/04* (2006.01)
 *H02K 7/02* (2006.01)
 *H02K 7/18* (2006.01)
 *F01D 15/10* (2006.01)
 *F02C 6/00* (2006.01)

(52) U.S. Cl. ................ 322/10; 322/4; 290/52
(58) Field of Classification Search ............. 322/4, 322/10; 290/52
See application file for complete search history.

(56) References Cited

U.S. PATENT DOCUMENTS

| | | | | |
|---|---|---|---|---|
| 4,001,666 | A | | 1/1977 | Grenfell ................ 322/4 |
| 4,617,507 | A | | 10/1986 | Eisenhaure ............... 322/4 |
| 5,635,768 | A | * | 6/1997 | Birch et al. ............ 290/40 C |
| 6,404,655 | B1 | * | 6/2002 | Welches ............... 363/41 |
| 6,639,328 | B2 | * | 10/2003 | Wacknov ............... 290/52 |
| 6,784,565 | B2 | * | 8/2004 | Wall et al. ............. 290/52 |
| 6,787,933 | B2 | * | 9/2004 | Claude et al. ........... 290/52 |
| 6,788,029 | B1 | | 9/2004 | Gabrys ............... 322/4 |
| 6,812,586 | B2 | * | 11/2004 | Wacknov et al. ......... 290/52 |
| 6,819,012 | B1 | | 11/2004 | Gabrys ............... 307/68 |
| 6,847,129 | B2 | * | 1/2005 | McKelvey et al. ........ 290/52 |
| 6,870,279 | B2 | * | 3/2005 | Gilbreth et al. ......... 290/52 |
| 6,879,053 | B1 | * | 4/2005 | Welches et al. ......... 290/6 |
| 6,888,263 | B2 | * | 5/2005 | Satoh et al. ........... 290/52 |
| 6,906,432 | B2 | * | 6/2005 | Belokon et al. ......... 290/52 |
| 6,943,531 | B2 | * | 9/2005 | Fukaya ............... 322/10 |
| 6,958,550 | B2 | * | 10/2005 | Gilbreth et al. ......... 290/52 |
| 6,969,922 | B2 | * | 11/2005 | Welches et al. ......... 290/1 A |
| 7,304,400 | B2 | * | 12/2007 | Kang et al. ........... 290/44 |
| 7,329,204 | B2 | * | 2/2008 | Senda et al. ........... 477/5 |

(Continued)

*Primary Examiner*—Nicholas Ponomarenko
*Assistant Examiner*—Pedro J Cuevas
(74) *Attorney, Agent, or Firm*—W. Warren Taltavull; Manelli Denison & Selter PLLC

(57) ABSTRACT

Use of a common electrical power bus to which a number of electrical power generators and consumers are coupled is well known. Typically, a high electrical capacitance is provided across the bus in order to provide stabilisation in the switching of generators and consumer devices as well as differences in the operational performances of the electrical power generators. Particularly in aerospace applications provision of high capacity electrical capacitors creates problems. By providing a feedback control and an electrical power converter take primary electrical power from an electro-mechanical converter associated with a rotating component of a prime mover, electrical power stabilisation is achieved by applying torque changes through the electromechanical converter to the rotating component of the prime mover such that stored electrical power can then be drawn as required to accommodate transients in electrical power on the bus.

15 Claims, 1 Drawing Sheet

U.S. PATENT DOCUMENTS

| | | | |
|---|---|---|---|
| 7,368,893 B2* | 5/2008 | Tsuzuki | 322/28 |
| 7,379,797 B2* | 5/2008 | Nasr et al. | 701/22 |
| 2002/0157881 A1* | 10/2002 | Bakholdin et al. | 180/65.2 |
| 2002/0163819 A1* | 11/2002 | Treece | 363/34 |
| 2002/0175522 A1* | 11/2002 | Wacknov et al. | 290/52 |
| 2002/0195821 A1* | 12/2002 | Wacknov | 290/12 |
| 2003/0015873 A1* | 1/2003 | Khalizadeh et al. | 290/7 |
| 2004/0084965 A1* | 5/2004 | Welches et al. | 307/64 |
| 2004/0135436 A1* | 7/2004 | Gilbreth et al. | 307/18 |
| 2004/0178640 A1* | 9/2004 | Satoh et al. | 290/52 |
| 2004/0245783 A1* | 12/2004 | Gilbreth et al. | 290/52 |
| 2005/0035744 A1 | 2/2005 | Potter | 322/4 |
| 2005/0140142 A1* | 6/2005 | Welches et al. | 290/41 |
| 2008/0143113 A1* | 6/2008 | Ichinose et al. | 290/44 |
| 2008/0150495 A1* | 6/2008 | Bulthaup et al. | 322/7 |

* cited by examiner

ELECTRICAL POWER STABILISATION

FIELD OF THE INVENTION

The present invention relates to electrical power stabilisation and more particularly to electrical power stabilisation with regard to a number of generators operating at different rotational speeds giving different electrical power frequencies, number of phases as well as values of electrical current and voltage.

BACKGROUND OF THE INVENTION

Recently attention has been directed towards providing a number of electrical power generators associated with rotary components of a prime mover such as a gas turbine engine. These generators are typically attached to rotating shafts on the high pressure and low pressure shafts of the gas turbine engine, rotating at different speeds and may be of different construction to satisfy the operation environment at respective locations. In such circumstances it will be understood that the generators produce electrical power at different frequencies, differing number of phases and with potentially different values of current and voltage. These differences in the electrical power produced by the respective generators mean that it is not possible to directly parallel two or more of the electrical machines as generators on a common electrical power distribution bus.

The conventional approach to paralleling of electrical generators is to condition the electrical power generated from each generator through a power electrical converter to feed a direct current (DC) power bus. Unfortunately a large amount of capacitance in the order of several thousand micro-Farads is required for such a power bus to maintain a steady value of bus voltage in the presence of distributing and switching loads, that is to say switching in and out of electrical generators as well as consumer device load requirements. It will also be understood that DC electrical power buses also provide a convenient distribution medium for exchanging energy between the respective rotating shafts of the prime mover machine, that is to say the gas turbine jet engine which may allow more efficient use of fuel within an operational episode with the prime mover such as a gas turbine engine in an aircraft during a flight cycle.

Traditionally land based electrical systems have utilised electrolytic capacitors which are particularly capacitance dense resulting in a size and weight benefit. However, this type of capacitor is not generally viable as an aerospace quality component because of limitations of operational temperature, capacitance stability, limited life and orientation limitations. In such circumstances, particularly in aerospace applications, less capacitive dense technologies such as film-foil are utilised such that a larger capacitor is required and therefore there is a significant weight and size penalty in order to achieve a practical arrangement. For example, if the required DC capacitor is in excess of 50,000 micro-Farad it will be understood with a typical practical film-foil capacitor having only 0.05 micro-Farads per square centimetre capacity then the total volume of capacitance required would be in excess of 1,000,000 cubic centimetres or 1,000 cubic metres and weight around 1000 kg. Clearly this is impractical and so limitations with respect to electrical power equalisation are a significant constraint upon appropriate application of multi power generator technologies. It will also be understood that large capacitors store very large amounts of energy which can be released in the event of a fault on a DC electrical network. This can give large fault currents of several thousands amps which are very difficult to control and result in significant transient forces being generated within the electrical distribution system. In such circumstances with large capacitors there is a significant risk of explosion or fire when the energy is rapidly released to a fault load.

SUMMARY OF THE INVENTION

In accordance with the present invention there is provided an electrical power stabilisation arrangement comprising a prime mover having a rotating component and an electro mechanical converter associated with the rotating component of the prime mover to convert electrical rotation into electrical power and vice versa by variable applied torque, the electro-mechanical converter coupled to an electrical power converter to respectively interchange primary electrical power with the electro-mechanical converter and secondary electrical power with an electrical power bus, a feed back control associated with the electrical power bus to stabilise electrical power provided on the electrical power bus by feedback to the electrical power converter in order to proportionately control electrical power to the electromechanical converter to alter the torque applied to the rotating component of the prime mover by the electro-mechanical converter.

Generally, the primary electrical power is of an alternating current.

Typically, the secondary electrical power is direct current.

Normally, the electro-mechanical converter is an electrical machine such as a generator/motor.

Typically, the electrical power bus has a number of generator and/or consumer devices-associated with it and the feed back control is configured to stabilise electrical power provided on the electrical power bus as a result of variable switching of these devices.

Preferably the prime mover is a gas turbine engine.

BRIEF DESCRIPTION OF THE DRAWINGS

An embodiment of the present invention will now be described by way of example and with reference to the accompanying drawings in which.

DETAILED DESCRIPTION OF THE INVENTION

Figure 1:
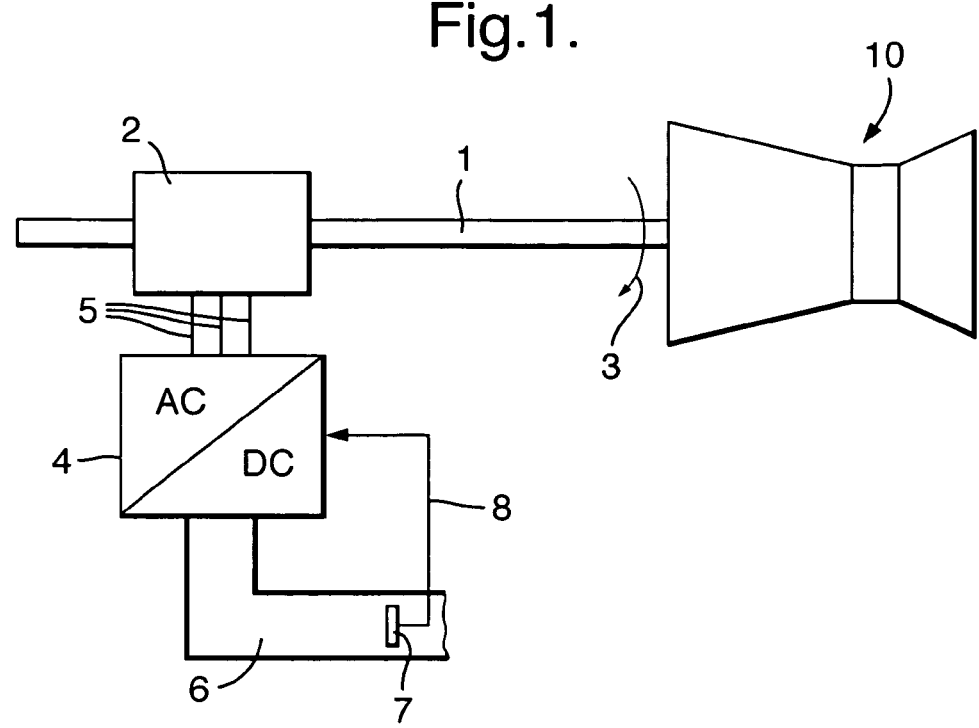
FIG. 1 is a schematic illustration of an electrical power stabilisation arrangement in accordance with the present invention.

As indicated above, a number of machines and prime movers such as gas turbine engines contain rotating components which have significant inertia and are considered to be speed-stiff. These machines also incorporate electrical machines which act as electrical power generators for energy recovery and therefore improve efficiency of operation. Due to their size the rotating components or parts of the prime mover, e.g. gas turbine, may have significant inertia. In such circumstances the rotating components of the prime mover have considerable amounts of stored energy and therefore can be considered resilient rotational speed flywheels which will not be disturbed by relatively small alterations in torque applied to them. The present invention relates to use of the stored energy in these high inertia rotating parts of the prime mover, but may also have application with low inertia rotating components with variations in torque application these having an effect on rotational speed. The objective is to provide an alternative relatively large direct electrical current (DC) storage capability to stabilise an electrical bus power distribution system. Generally, in such circumstances, it will be possible to use a smaller or even eliminate requirements for a large capacitor to maintain a steady bus voltage. Furthermore, such an arrangement reduces the weight and size requirements as well as the potential fault level of electrical current and so reduces the necessity and values for protective devices for sensitive systems.

The present invention comprises an electro-mechanical converter such as a motor/generator secured to a rotating component such as a shaft of a prime mover, e.g. a gas turbine engine. The electro-mechanical converter is coupled to a fast acting power electronic converter to enable energy transfer between the electrical and mechanical aspects of the arrangement. Thus, the electro-mechanical converter can be driven by rotation of the shaft of a prime mover in order to generate electricity whilst conversely electrical energy can be provided through the power electronic converter to the electro-mechanical converter in order to apply torque to the rotating component. It will be understood that generally in accordance wit the present invention the rotating component will have a high inertia such that modulation of power (or torque) on the rotating component of a prime mover, that is to say a gas turbine engine shaft, will have limited effect upon rotational speed. This is assuming that the rotating component has a high inertia relative to the torque modulation so that in situations where the rotating component of the prime mover has less inertia there may be effect upon rotational speed but clearly in terms of a gas turbine engine this will be unacceptable and therefore avoided.

As indicated above generally the electro mechanical converter will take the form of a motor/generator such that in addition to providing an electrical power stabilisation function, the electro mechanical converter can provide itself as indicated electrical power to the power converter in order to couple that electrical power to the distribution bus. In such circumstances the rotational force of the rotating component of the prime mover turns the electro mechanical converter in order to create the activity in a typical flywheel energy storage regime. In any event, the electro mechanical converter will provide additional electrical power generation capacity during high peaks in electrical power demand such that it is possible to more accurately define the base electrical power demand. In such circumstances it is possible through the provision of the present electro mechanical converter to allow a wider capacity for transient high peak electrical power demand such that there can be a reduction in the required rating of the normal operational motor/generator electrical power supply requirements, which in turn may allow for significant weight and space savings.

FIG. 1 provides a schematic illustration of an electrical power stabilisation arrangement in accordance with the present invention. Thus, a rotating component 1 driven by a prime mover 10, is associated with an electro mechanical converter 2. This electro mechanical converter, as indicated above, applies torque to the rotating component 1 in order to cause rotation or can be driven by that rotating component 1 in order to generate electrical power. In such circumstances the electro mechanical converter 2 generally takes the form of an electrical generator/motor which is mechanically coupled to the rotating component 1 of the prime mover 10, which will normally take the form of a shaft rotating in the direction of arrowhead 3.

As indicated above, the electro mechanical converter 2 operates upon primary electrical power exchanged with an electrical power converter 4. Normally, the primary power is transferred through an appropriate electrical coupling 5 in the form of an alternating electrical current which is converted by the power converter 4 into a direct electrical current coupled to an electrical bus distribution network 6. This bus electrical system as indicated previously, will generally provide electrical power to a number of electrical power consumer devices as well as have a number of electrical generators associated with it which may provide power in different phases, electrical voltages and otherwise. Thus, there is the potential at least for transient variations in the direct electrical current presented upon the bus 6 which with previous systems was provided with sufficient electrical ballast for use by a relatively large electrical capacitance. This electrical capacitance effectively acts as a transient store to smooth transient fluctuations in the electrical power demand upon the bus 6 as a result of switching of electrical generators supplied to the bus 6 as a well as electrical demand of consumer devices.

In order to provide at least a proportion of this electrical ballast for electrical power stabilisation the present arrangement includes a feedback control 7 associated with the bus 6 such that some direct electrical current is returned to the converter when the desired electrical voltage on the bus 6 is exceeded, or if there is a fall in the electrical voltage on the bus 6 then the control 7 will indicate to the converter 4 that electrical power must be extracted from the inertia energy store of the rotating component 1 of the prime mover 10 through the electro mechanical converter 2.

In normal operation it will be understood that the electro mechanical converter 2 is arranged to store in electrical windings within the converter 2 electrical power energy as a marginal excess torque capacity which will generally have an imperceivable effect on rotational speed of the rotating component 1 of the prime mover 10 in view of its inertia but which nevertheless, stores electrical power in those windings as a ballast for release during periods of voltage fluctuation upon the bus 6. It will be understood that the coupling 5 as indicated provides essentially primary electrical power coupling between the converter 2 and the converter 4 with the converter 4 supplying secondary electrical power to the bus 6. It is this secondary electrical power supply to the bus 6 which is adjusted through the backup electrical power presented through a coupling 8 from the bus 6 via the controller 7 to the electrical power converter 4.

If the controller 7 determines that the electrical power on the bus 6 in terms of its voltage is too high, then the feedback electrical power presented through the coupling 8 will act through the converter 4 to adjust the secondary electrical power presented from the converter 4 to the bus 6 by altering the efficiency of conversion of the primary electrical power 4 to the secondary electrical power in the converter 4 or by presenting primary electrical power through the coupling 5 to the electro-mechanical converter 2 in order that the windings in that converter 2 are energised to provide supplemental torque drive in the converter 2 which, as indicated, will be insignificant in terms of variation in rotational speed upon a normal high inertia rotating component 1 of the prime mover 10 but nevertheless, will store energy for subsequent use.

Where the electrical power on the bus 6 falls below the desired level, it will be appreciated that the controller 7 will determine such a situation and therefore provide through the coupling 8 an indication to switch the electrical power converter 4 such that initially electrical power stored as effectively excess torque within the electro mechanical converter 2 will be utilised in order to supplement the value of secondary electrical power provided by the converter 4 to the bus 6. It will be appreciated that the more sustained displacements in the electrical power on the bus 6 the controller and other aspects of the electrical power stabilisation arrangement may be arranged such that an electro mechanical converter 2 extracts power from the rotating component 1 of the prime mover 10 as a drag upon rotation of that component 1 in order to drive the electro mechanical converter 2 and so provide a positive primary electrical component to the converter 4 which contributes to the electrical power in the bus 6 for stabilisation.

Thus, the electrical power stabilisation arrangement transfers energy between an electrical system and a mechanical system in order to achieve a filtering action. This is achieved in a speed-stiff system by modulating the torque and is only relevant to mechanical systems with a substantial driving torque produced by a prime mover, for example a gas turbine engine.

Figure 2:
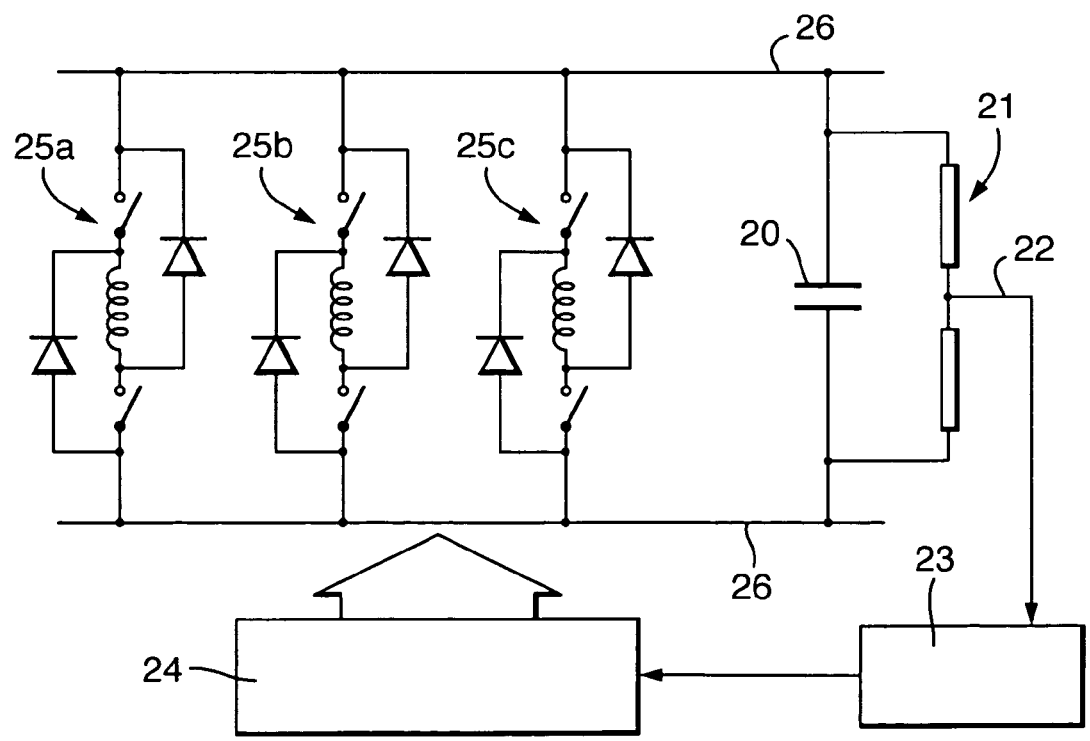
FIG. 2 is a schematic illustration of a feed back control arrangement for use in accordance with the present invention.

FIG. 2 provides a schematic illustration of a feedback control in accordance with the present invention. Thus, an electrical power distribution bus 26 includes a stabilising capacitance 20 with a voltage divider 21 typically in the form of two resistors with a tap connector 22 arranged to draw an electrical signal through a filter 23 for appropriate electrical power modulation of the primary electrical power described above with regard to FIG. 1. This modulation is performed through a control device 24 which acts upon electronic gates 25 which are part of the electrical power converter 4 (FIG. 1) in order to alter the secondary power supply to the bus 26. It will be appreciated through altering the electronic switch gates 25, the alternating electrical current presented to or from the power converter 4 to the electro mechanical converter as described in FIG. 1 can be adjusted as required and to allow the electro mechanical torque presented to the rotating component 1 of the prime mover 10 to be varied in order to store or recoup electrical energy as required for stabilisation within a system.

It will be understood that the present electrical power stabilisation arrangement means that a minimal direct current electrical power bus capacitance is required which in turn, in view of the described problems, with acceptable film-foil capacitors, means that there is a significant reduction in weight as well as the necessary accommodation space required by the capacitator. It will also be understood that there is a reduction in the stored electrical capacity such that the direct current fault level will be lower so that protection devices for other operational systems can similarly be downgraded and there is a possibility for extracting electricity from the electro mechanical converter in order to smooth the electrical power demand transience over the short term resulting in a reduced necessity to provide potential over capacity with regard to electrical generator ratings for normal operation.

The present electrical power stabilisation arrangement could be incorporated within an existing electrical machine driven with appropriate interfacing or direct current power supply buses. An example would be the switched reluctance or permanent magnet base starter generator systems which are primarily used for electrical power generation in aircraft systems. The DC bus stabilisation could be an added function and provided by suitable modulation of the torque (current) control loops within the electrical machine drive electronics. It will be understood that a typical bandwidth of torque is in the order of two kHz in terms of the alternating electrical current presented to the electro mechanical converter in order to drive rotation of the shaft as a motor or conversely the electrical power generated by driving electro mechanical converter through the rotating component.

Gas turbine based electrical generation can be applied to a wide range of areas in addition to that of aerospace. Thus, gas turbine electrical generation occurs in marine systems as well as land based electrical generation systems. Where power electronic interfaces are applied the control system in accordance with the present invention has the capability of wrapping the exchanged energy between the electrical and high inertia mechanical system of the rotating component in order to damp, stabilise and peak-lop electrical power demands.

We claim:

1. An electrical power stabilization arrangement comprising a prime mover having a rotating component and an electro-mechanical converter associated with the rotating component of the prime mover to convert electrical rotation into electrical power and vice versa by variable applied torque, the electro-mechanical converter being coupled to an electrical power converter, the electrical power converter being coupled to an electrical power bus, the electrical power converter being arranged to convert primary electrical power supplied from the electromechanical converter to secondary electrical power for the electrical power bus, a feed back control being arranged to determine the electrical power on the electrical power bus, the feedback control being arranged to stabilize electrical power on the electrical power bus, the feedback control being coupled to the electrical power converter and being arranged to adjust the secondary electrical power supplied by the electrical power converter to the electrical power bus, the feedback control being arranged to modulate the torque on the rotating component, the feedback control being arranged such that the electrical power converter supplies primary electrical power to the electromechanical converter to provide supplemental torque drive in the electromechanical converter to store energy in the form of torque in the electromechanical converter and the rotating component if the feedback control determines the voltage of electrical power on the electrical power bus is too high and causing electrical instability on said electrical power bus, and the feedback control being arranged such that energy stored as excess torque within the electromechanical converter and rotating component is converted by the electromechanical converter to primary electrical power and supplied to the electrical power converter to supplement secondary electrical power supplied by the electrical power converter to the electrical power bus if the feedback control determines the voltage of electrical power on the electrical power bus is too low and causing instability on said electrical power bus.

2. An arrangement as claimed in claim 1 wherein the primary electrical power is of an alternating current.

3. An arrangement as claimed in claim 1 wherein the secondary electrical power is a direct current.

4. An arrangement as claimed in claim 1 wherein the electro-mechanical converter is an electrical machine.

5. An arrangement as claimed in claim 4 wherein the electro-mechanical converter is a generator/motor.

6. An arrangement as claimed in claim 1 wherein the electrical power bus has a number of generator and/or consumer devices associated with it and the feed back control is configured to stabilize electrical power provided on the electrical power bus as a result of variable switching of these devices.

7. An arrangement as claimed in claim 1 wherein the prime mover is a gas turbine engine.

8. An arrangement as claimed in claim 1 wherein the feedback control comprises a voltage divider arranged across the electrical power bus and a tap connector arranged to draw an electrical signal through a filter to a control device which is arranged to act on the electrical power converter.

9. An arrangement as claimed in claim 8 wherein the voltage divider comprises two resistors.

10. An arrangement as claimed in claim 9 wherein the electrical power converter comprises electronic gates, the control device is arranged to act upon the electronic gates to control the supply of secondary electrical power to the electrical power bus.

11. An arrangement as claimed in claim 10 wherein the control device is arranged to adjust the electronic gates to adjust the primary electrical power supplied to or from the electro-mechanical converter.

12. An arrangement as claimed in claim 1 wherein the rotating component has high inertia and modulation of the torque has limited effect on the rotational speed of the rotating component.

13. A method of operating an electrical power stabilization arrangement comprising a prime mover having a rotating component and an electromechanical converter associated with the rotating component of the prime mover to convert rotation of the rotating component into primary electrical power and visa-versa by variable applied torque, the electro-mechanical converter being coupled to an electrical power converter, the electrical power converter being coupled to an electrical power bus, the electrical power converter being arranged to convert primary electrical power supplied from the electromechanical converter to secondary electrical power for the electrical power bus, the method comprising determining the electrical power on the electrical power bus in order to adjust the secondary electrical power supplied by the electrical power converter to the electrical power bus to stabilize the electrical power on the electrical power bus, the method further comprising modulating the torque on the rotating component by supplying primary electrical power from the electrical power converter to the electromechanical converter to provide supplemental torque drive in the electromechanical converter to store energy in the form of torque in the electromechanical converter and the rotating component when the voltage of electrical power on the electrical power bus is too high and causing instability on said electrical power bus, and converting energy stored in the form of torque within the electromechanical converter and rotating component to primary electrical power using the electromechanical converter and supplying the primary electrical power to the electrical power converter to supplement secondary electrical power supplied by the electrical power converter to the electrical power bus when the voltage of electrical power on the electrical power bus is too low and causing instability on said electrical power bus.

14. An electrical power stabilization arrangement comprising a prime mover having a rotating component and an electromechanical converter associated with the rotating component of the prime mover to convert rotation of the rotating component into primary electrical power and visa-versa by variable applied torque, the electromechanical converter being coupled to an electrical power converter, the electrical power converter being coupled to an electrical power bus, the electrical power converter being arranged to convert primary electrical power supplied from the electromechanical converter to secondary electrical power for the electrical power bus, a feedback control being arranged to determine the electrical power on the electrical power bus in order to adjust the secondary electrical power supplied by the electrical power converter to the electrical power bus to stabilize the electrical power on the electrical power bus, the feedback control being arranged to modulate the torque in the electromechanical converter and rotating component, the electric power converter being arranged to supply primary electrical power to the electromechanical converter to store energy in the form of torque in the electromechanical converter and the rotating component when the voltage of electrical power on the electrical power bus is too high and causing instability on said electrical power bus and the electromechanical converter being arranged to convert energy stored in the form of torque within the electromechanical converter and rotating component to primary electrical power when the voltage of electrical power on the electrical power bus is too low and causing instability on said electrical power bus.

15. A method of operating an electrical power stabilization arrangement comprising a prime mover having a rotating component and an electromechanical converter associated with the rotating component of the prime mover to convert rotation of the rotating component into primary electrical power and visa-versa by variable applied torque, the electromechanical converter being coupled to an electrical power converter, the electrical power converter being coupled to an electrical power bus, the electrical power converter being arranged to convert primary electrical power supplied from the electromechanical converter to secondary electrical power for the electrical power bus, the method comprising determining the electrical power on the electrical power bus in order to adjust the secondary electrical power supplied by the electrical power converter to the electrical power bus to stabilize the electrical power on the electrical power bus, the method further comprising modulating the torque in the electromechanical converter and rotating component, supplying primary electrical power to the electromechanical converter and storing energy in the form of torque in the electromechanical converter and the rotating component when the voltage of electrical power on the electrical power bus is too high and causing instability on said electrical power bus and converting energy stored in the form of torque within the electromechanical converter and rotating component to primary electrical power using the electromechanical converter when the voltage of electrical power on the electrical power bus is too low and causing instability on said electrical power bus.

* * * * *